United States Patent [19]

Sakurai

[11] Patent Number: 4,898,005

[45] Date of Patent: Feb. 6, 1990

[54] METHOD OF CONTROLLING IDLING ROTATIONAL SPEED OF INTERNAL COMBUSTION ENGINE FOR VEHICLES EQUIPPED WITH AIR CONDITIONING SYSTEMS

[75] Inventor: Yoshihiko Sakurai, Saitama, Japan

[73] Assignees: Diesel Kiki Co., Ltd., Tokyo; Mazda Motor Corporation, Hiroshima, both of Japan

[21] Appl. No.: 356,772

[22] Filed: May 24, 1989

[30] Foreign Application Priority Data

Jun. 22, 1988 [JP] Japan .................................. 63-154074

[51] Int. Cl.$^4$ ............................ F02M 3/00; F25B 1/00
[52] U.S. Cl. ...................................... 62/115; 62/228.5; 62/323.4; 123/339; 417/34
[58] Field of Search .................... 62/323.4, 228.5, 115; 417/34; 123/339

[56] References Cited

U.S. PATENT DOCUMENTS 3,103,128  9/1963  Gordon ............................. 417/34 X
4,400,935  8/1983  Louis ................................ 417/34 X
4,582,124  4/1986  Yoshimi et al. ..................... 62/228.5

FOREIGN PATENT DOCUMENTS 0138014  10/1981  Japan ...................................... 62/133
62-47732  2/1987  Japan .

Primary Examiner—William E. Wayner
Attorney, Agent, or Firm—Frishauf, Holtz, Goodman & Woodward

[57] ABSTRACT

A method of controlling the idling rotational speed of an internal combustion engine for an automotive vehicle equipped with an air conditioning system having a variable capacity compressor disposed to be driven by the engine and capable of being controlled by an external control signal. A value of a capacity control signal as the external control signal for controlling the capacity of the compressor is calculated. A value of torque required for starting the compressor is calculated based upon ambient temperature and the calculated value of the capacity control signal. The engine idling rotational speed is increased in accordance with the calculated starting torque. When the ambient temperature is higher than a predetermined value, the required starting torque is calculated based only upon the ambient temperature irrespective of the calculated value of the capacity control signal, whereas when the ambient temperature is lower than the predetermined value, the required starting torque is calculated based upon both the ambient temperature and the calculated value of the capacity control signal.

7 Claims, 5 Drawing Sheets

METHOD OF CONTROLLING IDLING ROTATIONAL SPEED OF INTERNAL COMBUSTION ENGINE FOR VEHICLES EQUIPPED WITH AIR CONDITIONING SYSTEMS

BACKGROUND OF THE INVENTION

This invention relates to a method of controlling the idling rotational speed of an internal combustion engine for vehicles equipped with air conditioning systems.

A compressor in an air conditioning system for vehicles is generally disposed to be driven by an internal combustion engine installed on the vehicle. The rotational speed of the engine is controlled to increase upon the start of the compressor during idling of the engine (so-called idling-up), in order to prevent a drop in the engine rotational speed due to increased load applied on the engine by the compressor.

According to conventional methods, the amount of a control parameter, e.g. intake air or fuel injection amount, is increased by a fixed amount to increase the idling enigne rotational speed irrespective of the magnitude of torque required for starting the compressor and applied on the engine as load. However, the magnitude of the starting torque of the compressor required under a condition of high ambient temperature and high thermal load on the compressor is quite different from that required under a condition of low ambient temperature and low thermal load on same, so that the idling engine rotational speed abruptly increases under condition of low ambient temperature and low thermal load at which the starting torque of the compressor is relatively small.

In order to overcome the above disadvantage, an air conditioning system has been proposed by Japanese Patent Publication (Kokoku) No. 62-47732, in which the idling engine rotational speed is controlled depending upon the capacity at which a variable capacity compressor thereof is operating, and which determines the starting torque of the compressor applied on the engine as load, so as to prevent an abrupt increase in the idling engine rotational speed when the compressor is started at low capacity and low thermal load.

However, according to the proposed air conditioning system, it is necessary to detect the actual capacity of the compressor to control the idling engine rotational speed, which requires the employment of a sensor for sensing the actual capacity of the compressor. Such a sensor causes an increased cost. Further, the compressor with the sensor mounted therein will be complicated in construction and large in size.

SUMMARY OF THE INVENTION

It is an object of the invention to provide a method of controlling the idling rotational speed of an internal combustion engine for a vehicle equipped with an air conditioning system, which is adapted to calculate the starting torque of the variable capacity compressor without directly sensing the capacity of the compressor to thereby enable to properly control the idling engine rotational speed based upon the calculated starting torque.

A further object of the invention is to properly control the idling engine rotational speed even when there occurs an abrupt change in the capacity control signal after the start of the variable capacity compressor.

To attain the above objects, the present invention provides a method of controlling the idling rotational speed of an internal combustion engine for an automotive vehicle equipped with an air conditioning system having a variable capacity compressor disposed to be driven by the engine and capable of being controlled by an external control signal, the method comprising the steps of:

(1) detecting a value of ambient temperature;

(2) calculating a value of a capacity control signal as the external control signal for controlling the capacity of the compressor;

(3) calculating a value of torque required for starting the compressor based upon the detected value of the ambient temperature and the calculated value of the capacity control signal; and (4) increasing the idling rotational speed of the engine in accordance with the calculated value of the torque required for starting the compressor.

Preferably, when the detected value of the ambient temperature is higher than a predetermined value, the torque required for starting the compressor is calculated based only upon the detected value of the ambient temperature irrespective of the calculated value of the capacity control signal, whereas when the detected value of the ambient temperature is lower than the predetermined value, the torque required for starting the compressor is calculated based upon the detected value of the ambient temperature and the calculated value of the capacity control signal.

More preferably, the value of the capacity control signal is calculated based upon operating parameters representative of thermal load on the air conditioning system.

Further preferably, an idling-up signal for increasing the idling rotational speed of the engine is calculated based upon the torque required for starting the compressor, the idling-up signal being outputted before the compressor is actually started so that the idling rotational speed is increased based upon the idling-up signal simultaneously with actual starting of the compressor.

The compressor may comprise a suction chamber, a crank chamber, a drive shaft connectible to the engine, a wobble plate disposed within the crank chamber and being rotatable together with the drive shaft, and a control valve for controlling pressure within the crank chamber to vary the inclination angle of the wobble plate relative to the drive shaft and hence vary the capacity of the compressor, the control valve comprising a bellows upon which acts pressure within the suction chamber, a valve body for bringing the crank chamber into and out of communication with the suction chamber, and an actuator operable in accordance with the capacity control signal, wherein the pressure within the crank chamber is controlled by the capacity control signal and the pressure within the suction chamber.

During operation of the compressor after starting, the idling rotational speed of the engine may be controlled in accordance with the torque required for operating the compressor.

The above and other objects, features, and advantages of the invention will be more apparent from the ensuing detailed description taken in conjunction with the accompanying drawings.

DETAILED DESCRIPTION

The invention will now be described in detail with reference to the drawings showing an embodiment thereof.

Figure 1:
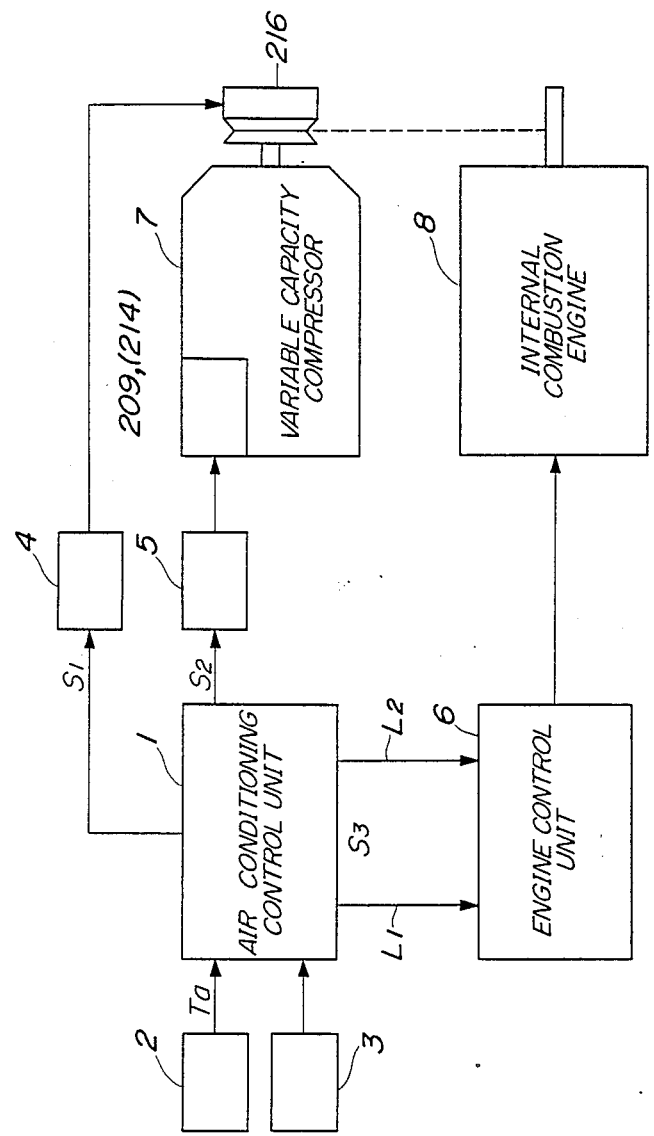
FIG. 1 is a block diagram of an air conditioning control unit of an air conditioning system and its associated devices, to which the method of the invention is applied.

Referring first to FIG. 1, there are illustrated an air conditioning control unit of an air conditioning system and its associated devices, to which the method of the invention is applied. In the figure, reference numeral 1 designates the air conditioning control unit, to which are supplied an output signal Ta from an ambient temperature sensor 2, and other output signals from other sensors 3 for sensing other operating parameters indicative of thermal load on the air conditioning system such as temperature within the vehicle compartment, the amount of solar radiation, moisture within the vehicle compartment, the position of an air-mixing door, the temperature of refrigerant gas, and the pressure of the refrigerant gas. The control unit 1 supplies a driving signal $S_1$ to an electromagnetic clutch 216 of a variable capacity compressor 7 which may be a wobble plate type, via a driving circuit 4 comprising a relay, for controlling the transmission of a driving force from an internal combustion engine 8 to the compressor 7. Another output signal $S_2$ is supplied from the control unit 1, via a driving circuit 5, to a solenoid 214 (as clearly shown in FIG. 2) of a control valve 209 provided in the compressor 7, for controlling pressure within a crank chamber 205 of the compressor 7, as hereinafter described. The output signal $S_2$ is calculated by the control unit 1 in response to output signals from the sensors 2 and 3, for controlling the capacity of the compressor 7. The control unit 1 further supplies an output signal $S_3$ indicative of torque required for starting the compressor 7 to an engine control unit 6 which in turn operates in response to the signal $S_3$ to increase the idling engine rotational speed (idling-up control), as hereinafter described. The engine control unit 6 may be constructed such that if the engine is a gasoline engine, it adjusts the amount of the intake air supplied to the engine, e.g. the amount of auxiliary air through an auxiliary air control valve, not shown, or the amount of intake air through a throttle valve, not shown, in the intake pipe, not shown, of the engine, while if the engine is a diesel engine, it adjusts the angle of the accelerator pedal, i.e. the fuel injection amount.

Figure 2:
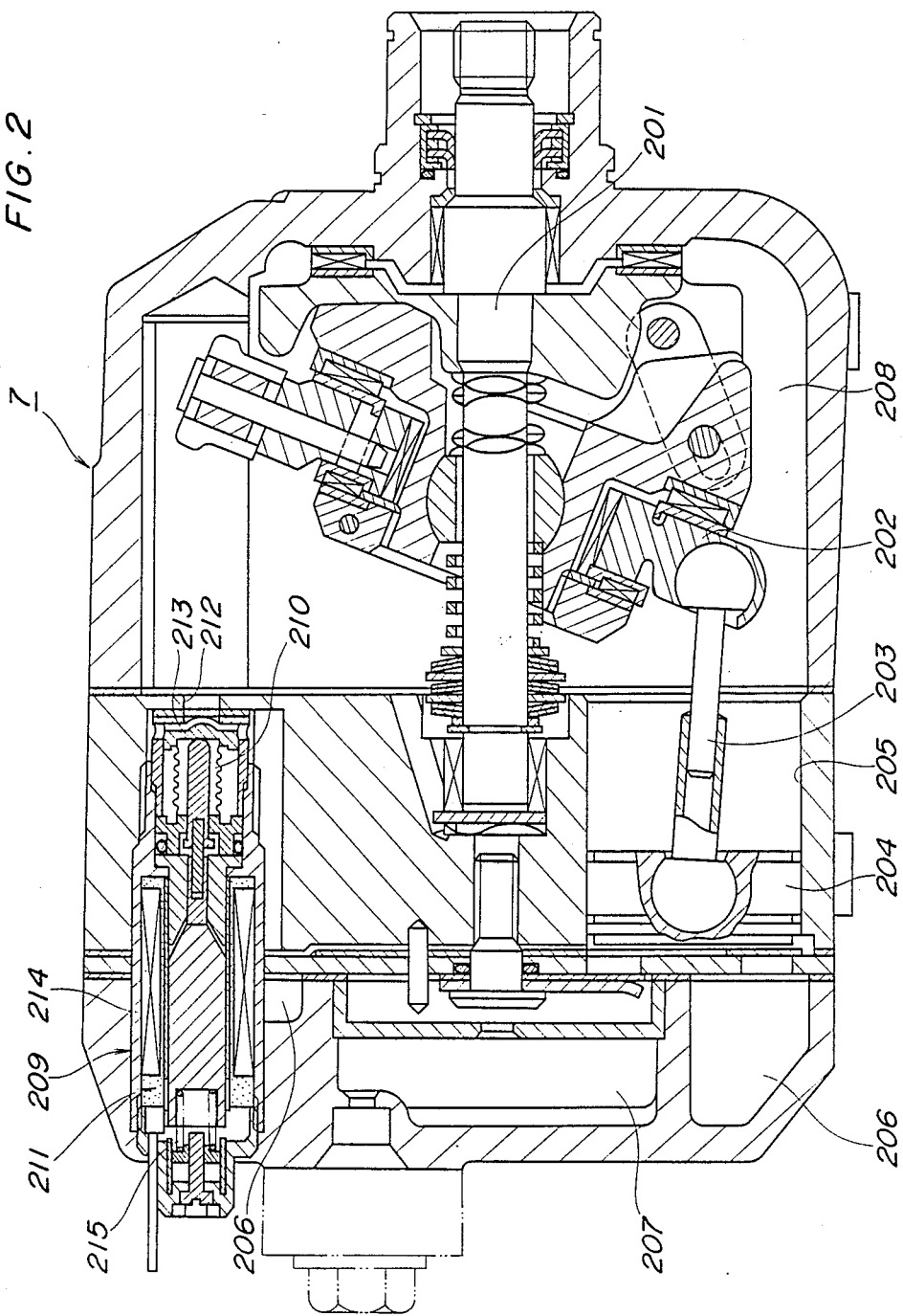
FIG. 2 is a longitudinal sectional view of a variable capacity wobble plate compressor appearing in FIG. 1.

FIG. 2 shows an example of the compressor 7, which is a variable capacity wobble plate compressor (hereinafter merely called the compressor) adapted to be controlled from an external control signal (signal $S_2$).

The compressor 7 has suction pressure thereof automatically controlled to a predetermined value, and at the same time the predetermined value of the suction pressure is controlled by the external or capacity control signal $S_2$ based upon the output signals from the sensors 2 and 3.

As shown in FIG. 2, the compressor 7 has a drive shaft 201 connected to the engine 8 shown in FIG. 1 via the electromagnetic clutch 216 so that the torque of the engine 8 is transmitted to the drive shaft 201 when the electromagnetic clutch 216 is in on-state, thereby driving the compressor 7. A wobble plate 202 is mounted on the drive shaft 201 and inclined at a predetermined angle to the axis of the drive shaft 201. The wobble plate 202 has a peripheral edge thereof connected to pistons 204 by means of respective connecting rods 203. The pistons 204 are arranged within respective cylinders 205 for reciprocating motion therein to introduce refrigerant gas from an evaporator, not shown, into the cylinders 205 via a suction chamber 206 and compress same. The compressed gas is then discharged into a condenser, not shown, via a discharge pressure chamber 207.

The inclination angle of the wobble plate 202 is determined by the balance between pressure within the crankcase 208 and the reaction forces of the pistons 204. More specifically, when a communication passage 212, hereinafter described, is closed to increase the pressure within the crankcase 208, the inclination angle of the plate 202 decreases to cause the piston stroke to be smaller, thereby decreasing the capacity of the compressor 7. On the other hand, when the communication passage 212 is open to decrease the pressure within the crankcase 208, the inclination angle increases to cause the piston stroke to be larger, thereby increasing the capacity of the compressor 7.

The pressure within the crankcase 208 is controlled by the control valve 209, which comprises a bellows 210 upon which acts pressure within the suction chamber 206, an electromagnetic actuator 211, and a valve body 213 for opening and closing the communication passage 212 between the suction chamber 206 and the crank chamber 208. The valve body 213 is moved to open and close the communication passage 212 in response to the state of balance between valve-closing pressure acting thereupon in such a direction as to close the passage 212, which is the sum of the force of a spring 215 and the attracting force of the solenoid 214 of the electromagnetic actuator 211, generated by current or signal $S_2$ applied to the solenoid, and valve-opening pressure, i.e. the suction pressure acting upon the bellows 210 in the opposite direction to open the passage 212. That is, as the value of the current applied to the solenoid 214 is increased, the valve-closing pressure is increased, whereby the capacity of the compressor 7 continuously decreases. As described before, the value of the current or signal $S_2$ applied to the solenoid 214 as capacity control means is controlled by the control unit 1.

Figure 3:
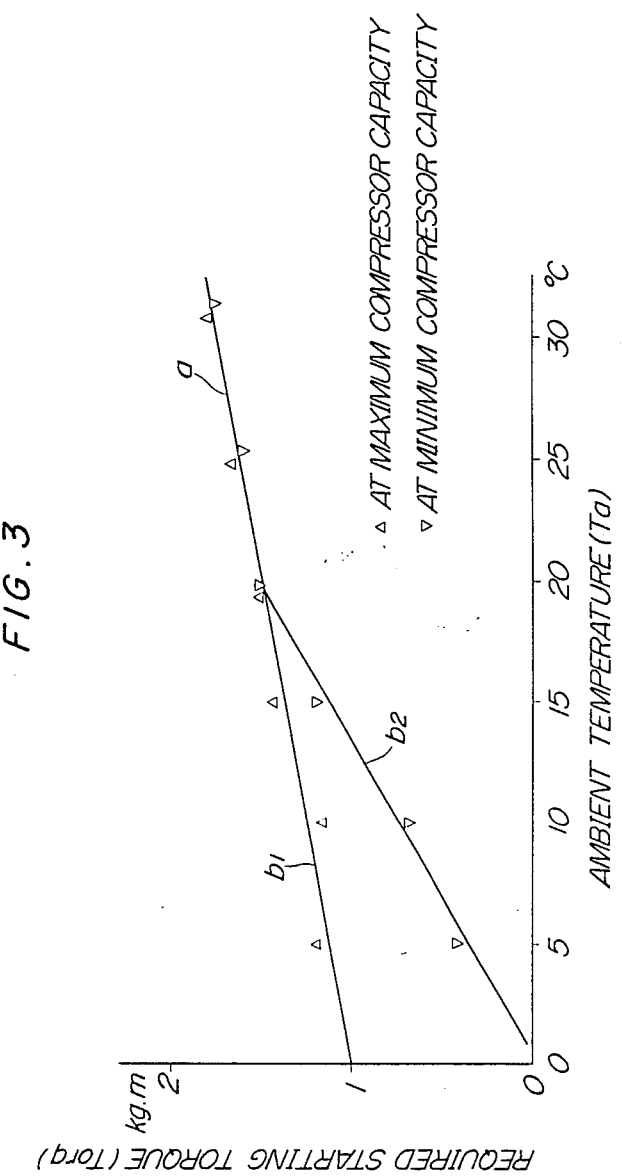
FIG. 3 is a graph showing the relationship between the ambient temperature Ta, a capacity control signal, and torque required for starting the compressor.

FIG. 3 is a graph showing an example of the relationship between the ambient temperature Ta, the capacity control signal $S_2$, and the torque Torq required for starting the compressor 7, which has been experimentally obtained. It will be understood from the figure that in a high temperature region in which the ambient temperature Ta exceeds a predetermined value $T_P$, e.g. 20° C., the torque Torq required for starting the compressor 7 linearly varies substantially in proportion to the ambient temperature Ta, irrespective of the capacity control signal $S_2$ from the control unit 1, as indicated by the line a of FIG. 3. On the other hand, in a low temperature region in which the ambient temperature Ta is below the predetermined value $T_P$, the required starting torque Torq varies in response to both the ambient temperature Ta and the capacity control signal $S_2$. That is, when the control signal $S_2$, which indicates the compressor capacity in terms of an analog value, assumes such a value as to cause the capacity of the compressor 7 to be the minimum, the required starting torque Torq varies as indicated by the line $b_2$ in FIG. 3, while when the control signal $S_2$ assumes such a value as to cause the capacity of the compressor 7 to be the maximum, the required starting torque Torq varies as indicated by the line $b_1$ in FIG. 3. Further, when the control signal $S_1$ assumes an intermediate value between the above values, the required starting torque Torq varies in proportion to the ambient temperature Ta within a region defined by the two lines $b_1$ and $b_2$.

The reason why the torque Torq required for starting the compressor 7 is not affected by the capacity control signal $S_2$ when the ambient temperature Ta exceeds the predetermined value $T_P$ will be explained as follows:

When the ambient temperature Ta is higher than the predetermined value $T_P$, the pressure within the suction chamber 206 is high, so that the valve body 213 is pulled by the bellows 210 which is then contracted in the direction to open the communication passage 212. At such a high temperature exceeding the predetermined value $T_P$, the contracting force of the bellows 210 in the valve-opening direction is much larger than the attracting force of the electromagnetic actuator 211 responsive to the capacity control signal $S_2$ which urges the valve body 213 in the direction to close the passage 212. In other words, the force responsive to the control signal $S_2$ in the valve closing direction is negligibly much smaller as compared with the contracting force of the bellows 210 in the valve opening direction. Therefore, it can be considered that the required starting torque Torq is hardly affected by the capacity control signal $S_2$ when the ambient temperature Ta exceeds the predetermined value $T_P$. On the other hand, when the ambient temperature Ta is below the predetermined value $T_P$, the pressure within the suction chamber 206 is so low that the required starting torque Torq is determined by both the capacity control signal $S_2$ and the ambient temperature Ta.

Therefore, the required starting torque Torq is obtained by the use of the following equations (1) and (2):

If $Ta \geq T_P$, $$Torq = \alpha \times Ta + \beta \quad (1)$$

If $Ta < T_P$, $$Torq = \alpha \times Ta + \beta + I_{SOL}/\gamma(Ta - T_P) \quad (2)$$

where $\alpha$, $\beta$, and $\gamma$ represent constants, and $I_{SOL}$ the amount of current generated by the driving circuit 5 in response to the capacity control signal $S_2$ and applied to the solenoid 214. $I_{SOL}$ may be the value of the control signal $S_2$ itself in the form of an analog value.

The air conditioning control unit 1 calculates the required starting torque Torq by the use of the above equations (1) and (2) responsive to Ta and $S_2$, and responsive to the calculated required starting torque Torq the engine control unit 6 determines an increment in the value of a control parameter (e.g. intake air amount) for causing an increase in the idling engine rotational speed.

Figure 4:
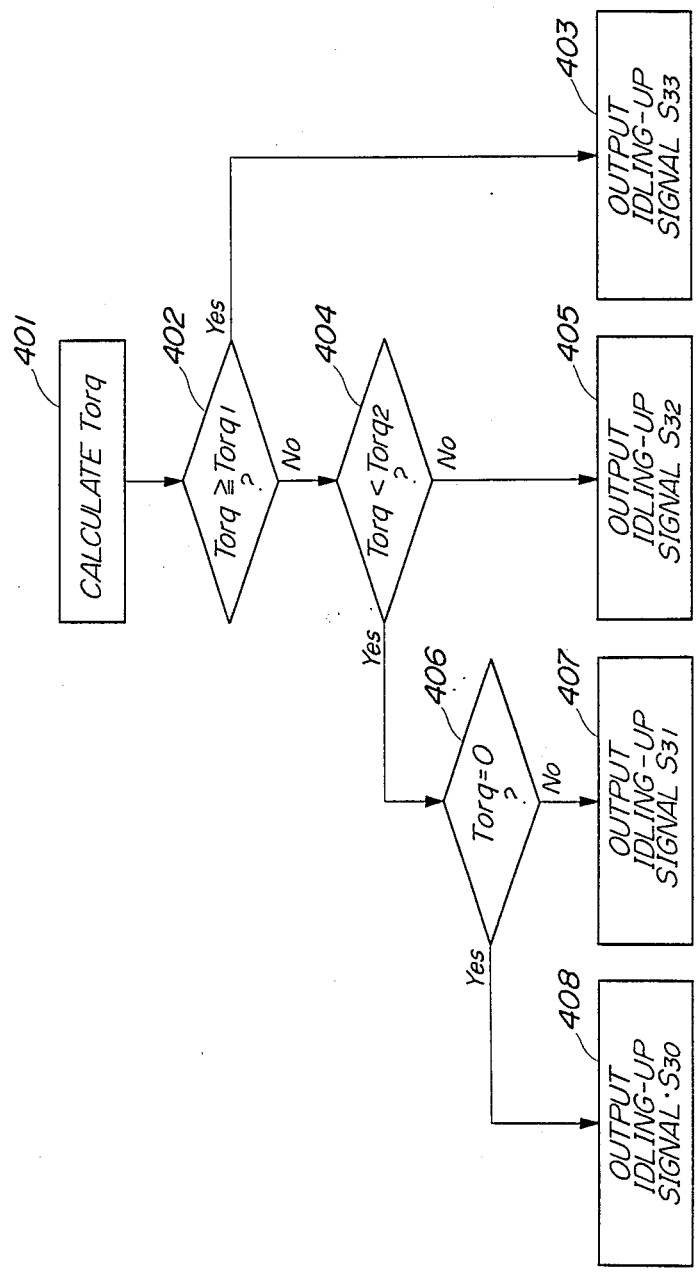
FIG. 4 is a flowchart of a program for generating idling-up signals $S_{20-23}$.

More specifically, the air conditioning control unit 1 determines the value of an idling-up signal $S_3$ from the calculated required starting torque Torq in accordance with the program shown in FIG. 4, which is supplied from the unit 1 to the engine control unit 6, which in turn controls the idling engine rotational speed so as to increase in response to the signal $S_3$. First, at a step 401, the required starting torque Torq is calculated in response to the ambient temperature Ta and the control signal $S_2$, by the use of the equations (1) and (2). At the next step 402 the calculated torque Torq is compared with a first predetermined value $Torq_1$, e.g. 2.0 kgm. If $Torq \geq Torq_1$, an idling-up signal $S_{33}$ is generated at a step 403, whereas if $Torq < Torq_1$, Torq is compared, at a step 404, with a second predetermined value $Torq_2$, e.g. 1.0 kgm, smaller than the first predetermined value $Torq_1$. If $Torq \geq Torq_2$ at the step 404, an idling-up signal $S_{32}$ is generated at a step 405, whereas if $Torq < Torq_2$ at the step 404, it is determined at a step 406 whether or not $Torq = 0$. If $Torq > 0$ at the step 406, an idling-up signal $S_{31}$ is generated at a step 407, whereas if $Torq = 0$, an idling-up signal $S_{30}$ is generated at a step 408.

The air conditioning control unit 1 and the engine control unit 6 are electrically connected with each other e.g. by two signal lines $L_1$, $L_2$ as shown in FIG. 1. The idling-up signal $S_3$ (i.e. $S_{30} - S_{33}$) consists of combinations of a high level voltage H and a low level voltage L which are supplied from the control unit 1 to the control unit 6 through the two signal lines $L_1$ and $L_2$, as shown in the following table:

|  |  | Signal Line $L_1$ | Signal Line $L_2$ |
| --- | --- | --- | --- |
| Idling | $S_{33}$ | H | H |
| -Up | $S_{32}$ | H | L |
| Signal | $S_{31}$ | L | H |
| $S_3$ | $S_{30}$ | L | L |

The engine control unit 6 supplies the engine 8 with a control signal corresponding to the idling-up signal $S_3$, and the engine 8 in turn controls the amount of an increase in the idling engine rotational speed in such a manner that the increase amount gradually decreases in the order of $S_{33}$, $S_{32}$, $S_{31}$, and $S_{30}$. To increase the idling rotational speed, the engine 8 is adapted to vary the throttle valve opening or the angle of the accelerator pedal, for example, in response to the control signal from the control unit 6.

Although the value of torque required for operating the compressor after the start of the compressor 7 is slightly different from that of the required starting torque Torq, the difference between them is so small that the control unit 6 can adjust the idling engine rotational speed to a desired value by feedback control during idling. Therefore, the air conditioning control unit 1 continues to supply the idling-up signal $S_3$ corresponding to the torque Torq obtained by the use of the equations (1) and (2) even after the start of the compressor 7.

Although in the above described embodiment, the idling engine rotational speed is stepwise increased in response to the required starting torque Torq, it may be increased in a continuous manner.

Figure 5:
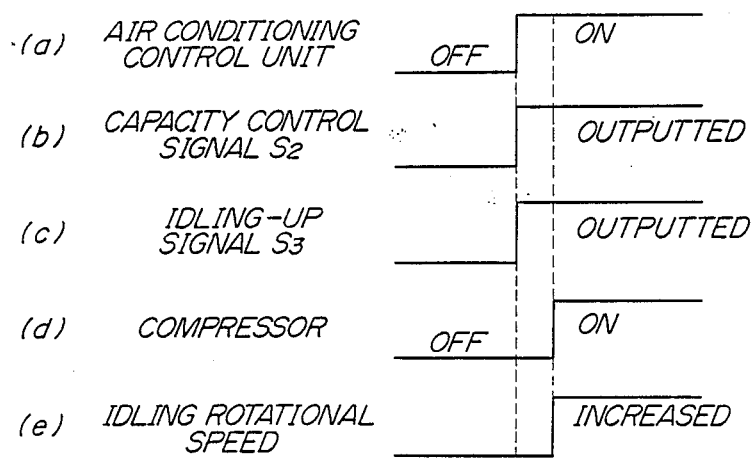
FIG. 5 is a timing chart showing the relationship in timing of operation between the air conditioning control unit and the associated devices appearing in FIG. 1.

FIG. 5 shows the relationship in timing of operation between the air conditioning control unit 1 and its associated devices.

When the control unit 1 is turned on as shown in (a) of FIG. 5, the control unit 1 reads in values of parameters from the sensors 2 and 3 and calculates and outputs the capacity control signal $S_2$, as shown in (b) of FIG. 5. At the same time the control unit 1 calculates the required starting torque Torq in response to the capacity control signal $S_2$ and the ambient temperature Ta from the sensor 2 to output the idling-up signal $S_3$, as shown in (c) of FIG. 5. Further, the control unit 1 outputs the driving signal S1 to energize the electromagnetic clutch 216 to thereby cause transmission of the driving force of the engine 8 to the compressor 7, as shown in (d) of FIG. 5. The electromagnetic clutch 216 is adapted to be actually engaged with a few seconds' delay after the driving signal $S_1$ is first applied thereto, that is, the compressor 7 is actually started a few seconds after the control unit 1 outputs the driving signal $S_1$. Therefore, the idling-up signal $S_3$ responsive to the required starting torque Torq is always inputted to the engine control unit 6 before the compressor 7 is actually started. The engine control unit 6 increases the idling engine rotational speed in response to the idling-up signal $S_3$ simultaneously with actual starting of the compressor 7, as shown in (e) of FIG. 5.

As described above, according to the method of the present invention, since the required starting torque of the compressor can be calculated without sensing the capacity of the compressor to thereby properly control the idling engine rotational speed based upon the calculated starting toque, the compressor can be made compact in size and simple in construction without a sensor for sensing the capacity thereof, and hence low in cost.

Further, in the conventional air conditioning system, in which the idling engine rotational speed is controlled depending upon the capacity of the compressor, when the capacity control signal $S_2$ suddenly changes in value during operation of the compressor, the idling rotational speed is adjusted only after the inclination angle of the wobble plate of the compressor is varied in response to the sudden change in the capacity control signal to thereby vary the capacity of the compressor, so that the idling rotational speed cannot be varied promptly after the abrupt change in the capacity control signal during operation of the compressor. On the other hand, according to the method of the invention, since the idling-up signal is calculated based upon the capacity control signal, the idling rotational speed can be varied promptly in response to an abrupt change in the capacity control signal.

Also, while in the conventional air conditioning system, the capacity of the compressor at the start thereof does not necessarily correspond to the magnitude of load actually applied on the engine by the compressor upon starting, so that the idling engine rotational speed temporarily assumes an improper value at the start of the compressor, according to the invention, the idling engine rotational speed is controlled in accordance with torque required for starting the compressor, so that it can always assume a proper value at the start of the compressor.

What is claimed is:

1. A method of controlling the idling rotational speed of an internal combustion engine for an automotive vehicle equipped with an air conditioning system having a variable capacity compressor disposed to be driven by said engine and capable of being controlled by an external control signal, the method comprising the steps of:
   (1) detecting a value of ambient temperature;
   (2) calculating a value of a capacity control signal as said external control signal for controlling the capacity of said compressor;
   (3) calculating a value of torque required for starting said compressor based upon the detected value of the ambient temperature and the calculated value of said capacity control signal; and
   (4) increasing the idling rotational speed of said engine in accordance with the calculated value of the torque required for starting said compressor.

2. A method as claimed in claim 1, wherein when the detected value of the ambient temperature is higher than a predetermined value, the torque required for starting said compressor is calculated based only upon the detected value of the ambient temperature irrespective of the calculated value of said capacity control signal, whereas when the detected value of the ambient temperature is lower than said predetermined value, the torque required for starting said compressor is calculated based upon the detected value of the ambient temperature and the calculated value of said capacity control signal.

3. A method as claimed in claim 1, wherein the value of said capacity control signal is calculated based upon operating parameters representative of thermal load on said air conditioning system.

4. A method as claimed in claim 2, wherein the value of said capacity control signal is calculated based upon operating parameters representative of thermal load on said air conditioning system.

5. A method as claimed in claim 1, wherein an idling-up signal for increasing the idling rotational speed of said engine is calculated based upon the torque required for starting said compressor, said idling-up signal being outputted before said compressor is actually started so that the idling rotational speed is increased based upon said idling-up signal simultaneously with actual starting of said compressor.

6. A method as claimed in claim 1, wherein said compressor comprises a suction chamber, a crank chamber, a drive shaft connectible to said engine, a wobble plate disposed within said crank chamber and being rotatable together with said drive shaft, and a control valve for controlling pressure within said crank chamber to vary the inclination angle of said wobble plate relative to said drive shaft and hence vary the capacity of said compressor, said control valve comprising a bellows upon which acts pressure within said suction chamber, a valve body for bringing said crank chamber into and out of communication with said suction chamber, and an actuator operable in accordance with said capacity control signal, wherein the pressure within said crankcase is controlled by said capacity control signal and the pressure within said suction chamber.

7. A method of controlling the idling rotational speed of an internal combustion engine for an automotive vehicle equipped with an air conditioning system having a variable capacity compressor disposed to be driven by said engine and capable of being controlled by an external control signal, the method comprising the steps of:
   (1) detecting a value of ambient temperature;
   (2) calculating a value of a capacity control signal as said external control signal for controlling the capacity of said compressor;
   (3) calculating a value of torque required for operating said compressor based upon the detected value of the ambient temperature and the calculated value of said capacity control signal; and
   (4) controlling the idling rotational speed of said engine in accordance with the calculated value of the torque required for operating said compressor.

* * * * *

UNITED STATES PATENT AND TRADEMARK OFFICE
CERTIFICATE OF CORRECTION

PATENT NO. : 4,898,005
DATED : February 6, 1990
INVENTOR(S) : SAKURAI et al

It is certified that error appears in the above-identified patent and that said Letters Patent is hereby corrected as shown below:

In the title page, under "FOREIGN PATENT DOCUMENTS",

"62-47732 2/87 Japan" should read --62-47732 10/87 Japan--.

Signed and Sealed this

Fourth Day of February, 1992

Attest:

HARRY F. MANBECK, JR.

Attesting Officer

Commissioner of Patents and Trademarks